(12) United States Patent
Hook

(10) Patent No.: US 7,347,607 B1
(45) Date of Patent: Mar. 25, 2008

(54) FISHING ROD ILLUMINATION SYSTEM

(76) Inventor: David A. Hook, 1825 Demastus La., Ocoee, FL (US) 34761

( * ) Notice: Subject to any disclaimer, the term of this patent is extended or adjusted under 35 U.S.C. 154(b) by 35 days.

(21) Appl. No.: 11/349,580

(22) Filed: Feb. 7, 2006

(51) Int. Cl.
*F21V 33/00* (2006.01)

(52) U.S. Cl. .................. 362/577; 362/581; 43/17.5; 43/17.6

(58) Field of Classification Search .............. 362/577, 362/581; 43/17.5–17.6, 42.31
See application file for complete search history.

(56) References Cited

U.S. PATENT DOCUMENTS

| | | | |
|---|---|---|---|
| 4,020,578 A * | 5/1977 | Hope | 43/17 |
| 4,369,486 A | 1/1983 | Pool | 362/32 |
| 4,617,751 A | 10/1986 | Johansson | 43/17.5 |
| 4,741,120 A | 5/1988 | Cota et al. | 43/17.6 |
| 4,899,480 A | 2/1990 | Park | 43/4 |
| 5,063,700 A | 11/1991 | Kiefer et al. | 43/17.6 |
| 5,172,508 A | 12/1992 | Schmidt et al. | 43/18.1 |
| 5,182,873 A | 2/1993 | Aragon, Jr. | 43/17 |
| 5,276,990 A | 1/1994 | Ramirez | 43/17.5 |
| 5,321,391 A * | 6/1994 | Fox | 340/573.2 |
| 5,347,741 A | 9/1994 | Konrad | 43/17.5 |
| 5,414,951 A | 5/1995 | Martin | 43/17.5 |
| 5,483,767 A | 1/1996 | Langer | 43/4 |
| 5,511,335 A | 4/1996 | Langer | 43/4 |
| 5,546,695 A | 8/1996 | Langer | 43/44.98 |
| 5,738,433 A | 4/1998 | Sparks | 362/109 |
| 5,826,366 A | 10/1998 | Matibe | 43/17.5 |
| 5,833,156 A | 11/1998 | Park et al. | 242/289 |
| 6,000,808 A | 12/1999 | Hansen | 362/109 |
| 6,149,286 A | 11/2000 | Wiggins | 362/259 |
| 6,193,387 B1 * | 2/2001 | Schlichting | 362/109 |
| 6,220,538 B1 * | 4/2001 | Durso | 242/250 |
| 6,523,987 B1 | 2/2003 | Lee | 362/577 |
| 6,546,665 B1 | 4/2003 | Eldredge et al. | 43/17.5 |
| 6,789,348 B1 | 9/2004 | Kneller et al. | 43/17.5 |

* cited by examiner

*Primary Examiner*—Jong-Suk (James) Lee
*Assistant Examiner*—Robert May

(57) ABSTRACT

A fishing rod illumination system for fishing lures that utilize fiber-optics to attract fish. The fishing rod illumination system includes a fishing reel, a light source within the fishing reel, a control pad in communication with the light source to control the light source, and a length of fiber optic fishing line connected to the fishing reel.

18 Claims, 8 Drawing Sheets

FISHING ROD ILLUMINATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fishing rods and more specifically it relates to a fishing rod illumination system for increasing the odds of catching fish for fishermen of all skill levels.

2. Description of the Related Art

Any discussion of the prior art throughout the specification should in no way be considered as an admission that such prior art is widely known or forms part of common general knowledge in the field.

Fishing rods have been in use for years. Conventional fishing rods are comprised of an elongated rod, a reel attached to an end of the elongated rod and a length of fishing line attached to the reel extending through eyelets on the rod. A fishing hook, lure and/or bait is attached to the distal portion of the fishing line which is used to catch fish. The main problem with conventional fishing rods is that they require natural light to illuminate the lures. There are fishing lures that utilize fiber-optics to attract fish or light sticks, however if the fishing line is broken the light source is also lost.

While these devices may be suitable for the particular purpose to which they address, they are not as suitable for increasing the odds of catching fish for fishermen of all skill levels. Conventional fishing rods do not provide a separate light source for illuminating a fishing hook, lure and/or bait attached to the fishing line.

In these respects, the fishing rod illumination system according to the present invention substantially departs from the conventional concepts and designs of the prior art, and in so doing provides an apparatus primarily developed for the purpose of increasing the odds of catching fish for fishermen of all skill levels.

BRIEF SUMMARY OF THE INVENTION

In view of the foregoing disadvantages inherent in the known types of fishing rods now present in the prior art, the present invention provides a new fishing rod illumination system construction wherein the same can be utilized for increasing the odds of catching fish for fishermen of all skill levels.

The general purpose of the present invention, which will be described subsequently in greater detail, is to provide a new fishing rod illumination system that has many of the advantages of the fishing rods mentioned heretofore and many novel features that result in a new fishing rod illumination system which is not anticipated, rendered obvious, suggested, or even implied by any of the prior art fishing rods, either alone or in any combination thereof.

To attain this, the present invention generally comprises a fishing reel, a light source within the fishing reel, a control pad in communication with the light source to control the light source, and a length of fiber optic fishing line connected to the fishing reel.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fishing rod illumination system that will overcome the shortcomings of the prior art devices.

A second object is to provide a fishing rod illumination system for increasing the odds of catching fish for fishermen of all skill levels.

Another object is to provide a fishing rod illumination system that may be utilized on various styles, types and brands of fishing rods.

An additional object is to provide a fishing rod illumination system that may be added to an existing fishing rod or fishing apparatus, or constructed as a new fishing rod.

A further object is to provide a fishing rod illumination system that effectively illuminates a fishing hook, lure and/or bait.

Another object is to provide a fishing rod illumination system that allows for the adjustment of the color, intensity, and/or pulse rate of the light used to illuminate the fishing hook, lure and/or bait.

A further object is to provide a fishing rod illumination system that draws fish towards a fishing hook, lure and/or bait.

A further object is to provide a fishing rod illumination system that produces one or more light sources for increasing the enticement of fish.

A further object is to provide a fishing rod illumination system that may be utilized in various water conditions (e.g. dark, murky).

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
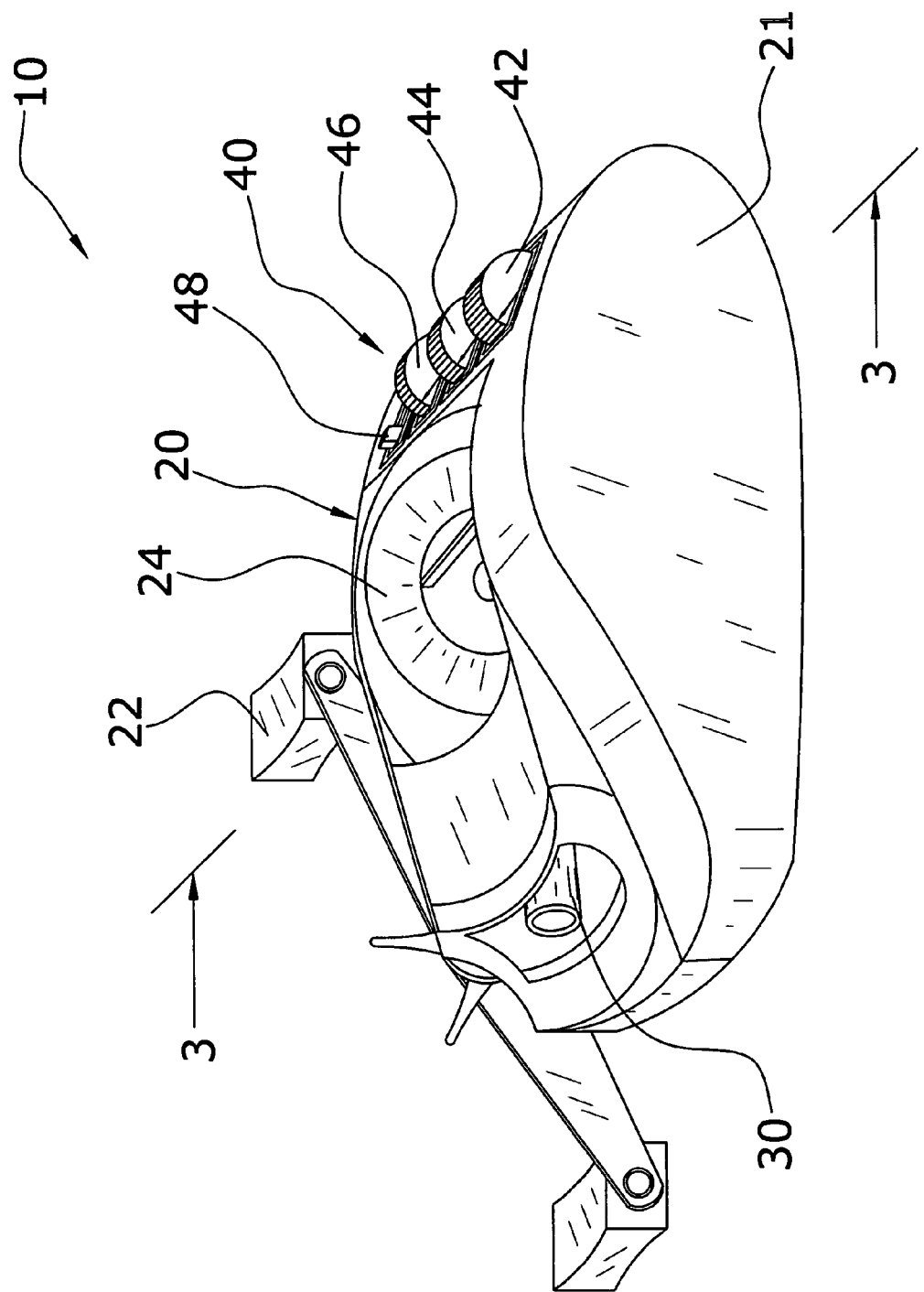
FIG. 1 is an upper perspective view of the present invention.

Turning now descriptively to the drawings, in which similar reference characters denote similar elements throughout the several views, FIGS. 1 through 9 illustrate a fishing rod illumination system 10, which comprises a fishing reel 20, a light source within the fishing reel 20, a control pad 40 in communication with the light source to control the light source, and a length of fiber optic fishing line 60 connected to the fishing reel 20.

B. Fishing Reel

Figure 2:
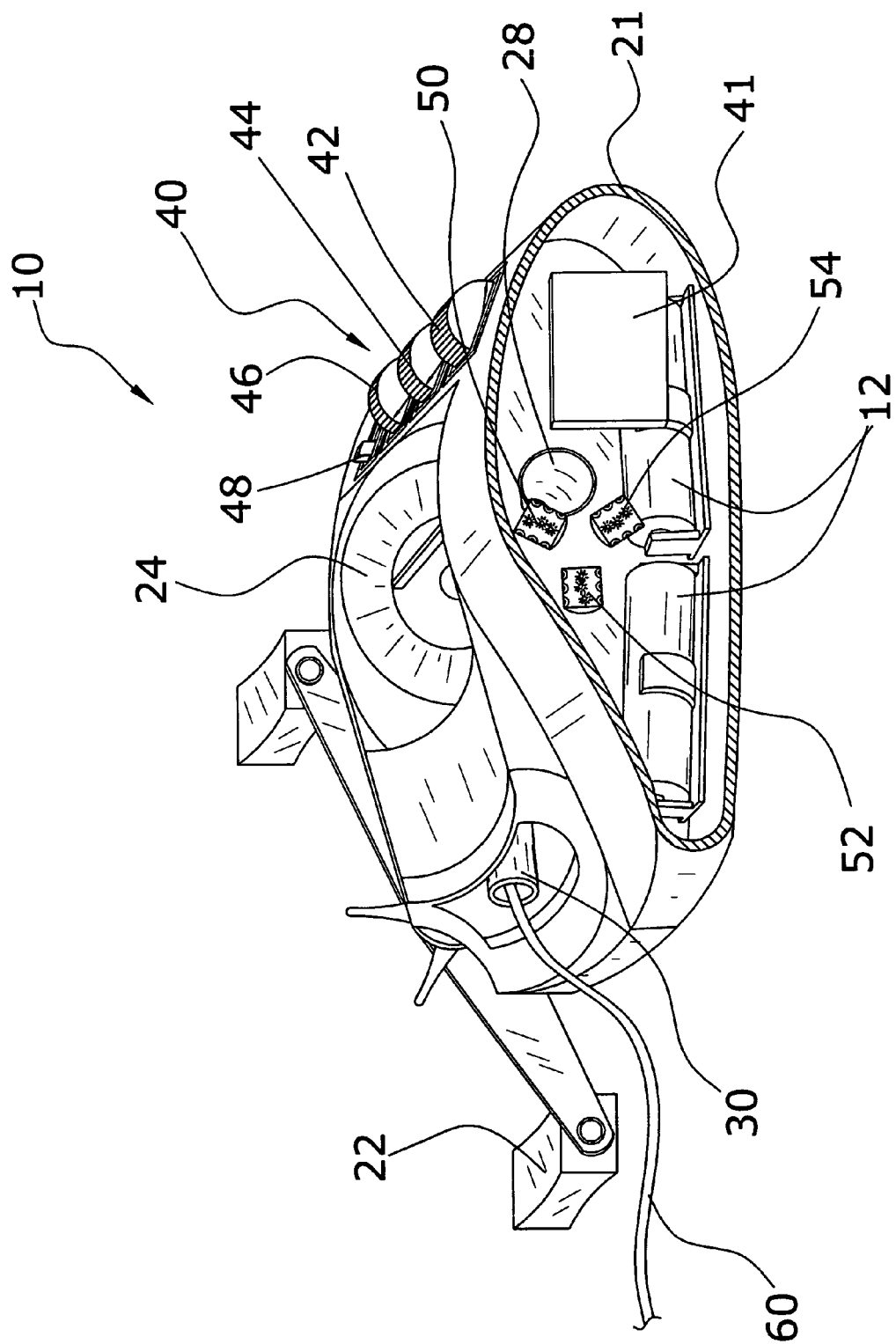
FIG. 2 is an upper perspective partial cutaway of the present invention.
Figure 5:
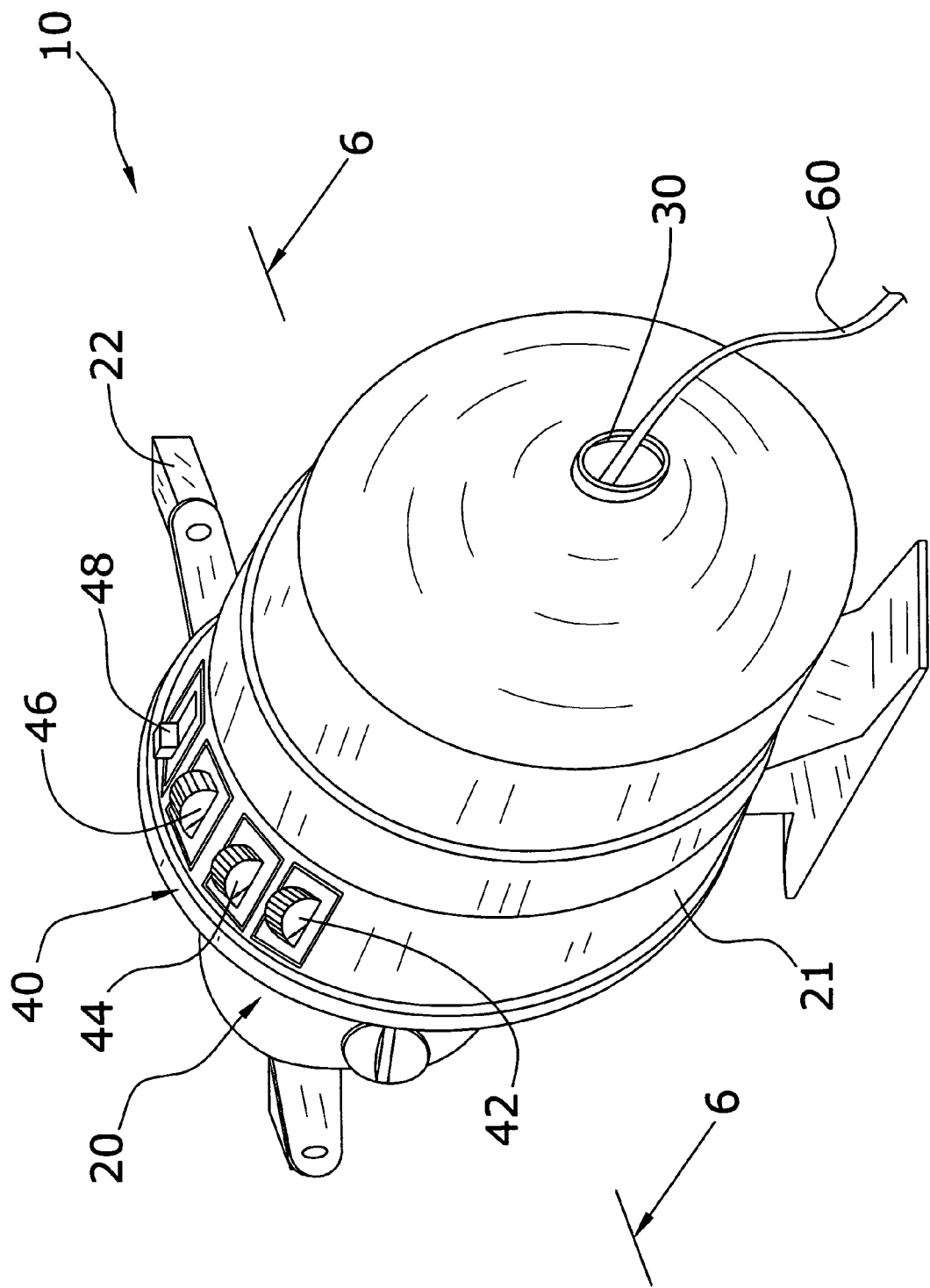
FIG. 5 is an upper perspective view of the present invention embodied in a different reel design.

FIGS. 1, 2 and 5 illustrate exemplary fishing reels 20 suitable for use in the present invention. The type of fishing reel 20 used for the present invention is not significant as long as it is capable of receiving and dispensing a length of the fiber optic fishing line 60. The fishing line is attached to the fishing rod 14 utilizing conventional fastener methods used to secure conventional reels to conventional rods.

Figure 3:
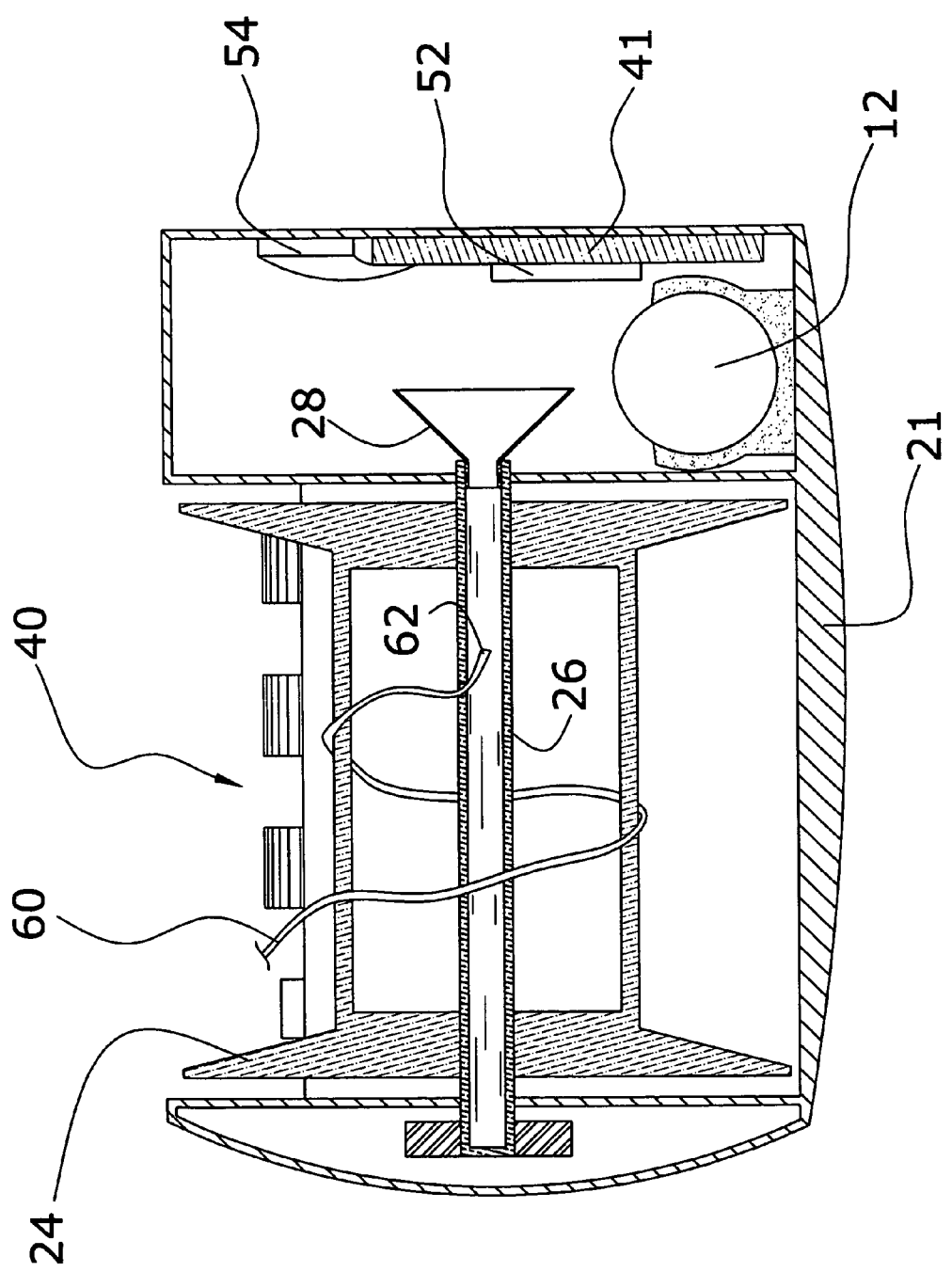
FIG. 3 is a cross sectional view taken along line 3-3 of FIG. 1.
Figure 4:
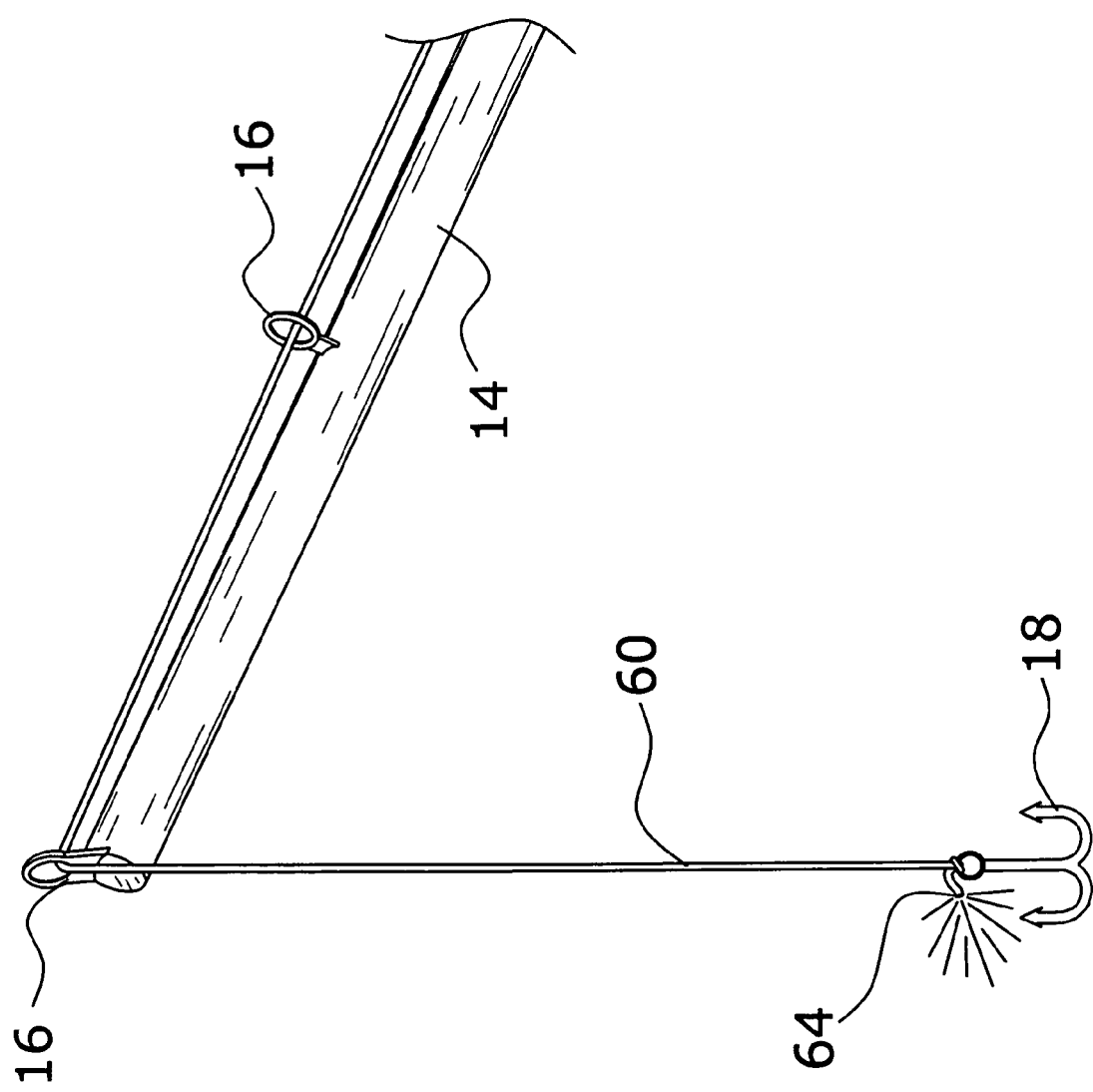
FIG. 4 is a magnified upper perspective view of the upper part of the rod with the fiber optic fishing line illuminating a fishing hook.

The fishing reel 20 includes a housing 21 with an interior cavity that receives the light source as shown in FIGS. 1 through 3 of the drawings. The housing 21 may have various shapes and structures as can be appreciated. The housing 21 stores a significant portion of the present invention including electrical components.

The fishing reel 20 includes a spool 24 that receives and dispenses the length of fiber optic fishing line 60 as best illustrated in FIGS. 2 and 3 of the drawings. A handle 22 is mechanically connected to the spool 24 to rotate the spool 24 in a clockwise or counterclockwise direction as are conventionally used in the fishing industry.

The fishing reel 20 preferably includes a tube 26 that has an interior lumen to receive light emitted by the light source as shown in FIG. 3 of the drawings. The inner end 62 of the fiber optic fishing line 60 extends through and into the tube 26 as further shown in FIG. 3 of the drawings. The inner end 62 of the fiber optic fishing line 60 is preferably directed substantially towards the light source to collect and efficiently transfer a significant portion of the light emitted by the light source.

A cone 28 is preferably attached to an end of the tube 26 for directing light emitted from the light source into the interior lumen of the tube 26 as shown in FIGS. 2 and 3 of the drawings. The cone 28 is preferably comprised of a light reflective inner surface to efficiently transfer the light into the tube 26. The light source is preferably positioned substantially in opposition to the broad opening of the cone 28 as shown in FIG. 2 of the drawings.

C. Light Source

The light source is positioned within the fishing reel 20 and emits light into the fiber optic fishing line 60. The light source may be comprised of various types of light sources.

Figure 6:
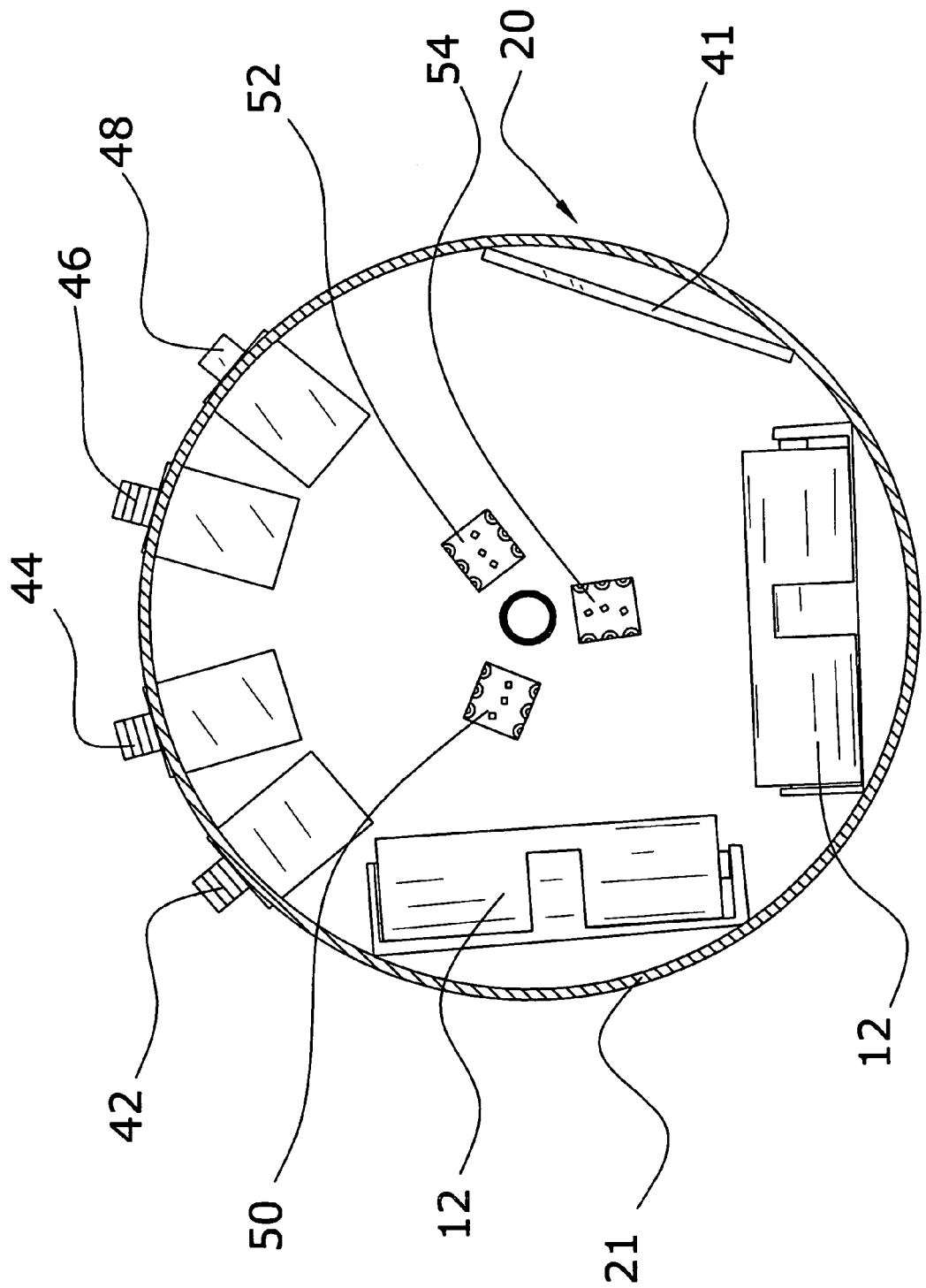
FIG. 6 is a cross sectional view taken along line 6-6 of FIG. 5.

The light source is preferably capable of emitting various light colors preferably at various pulse rates, intensities and color pattern sequences. As shown in FIGS. 2 and 6 of the drawings, the light source is comprised of a first LED 50 emitting a first colored light, a second LED 52 emitting a second colored light and a third LED 54 emitting a third colored light. It is preferable that each of the LEDs 50, 52, 54 emit a different colored light such as the primary colors to allow for the creation of a virtually unlimited number of colors. It is preferably that the first colored light consists of yellow, the second colored light consists of red and the third colored light consists of blue.

D. Controller

Figure 9:
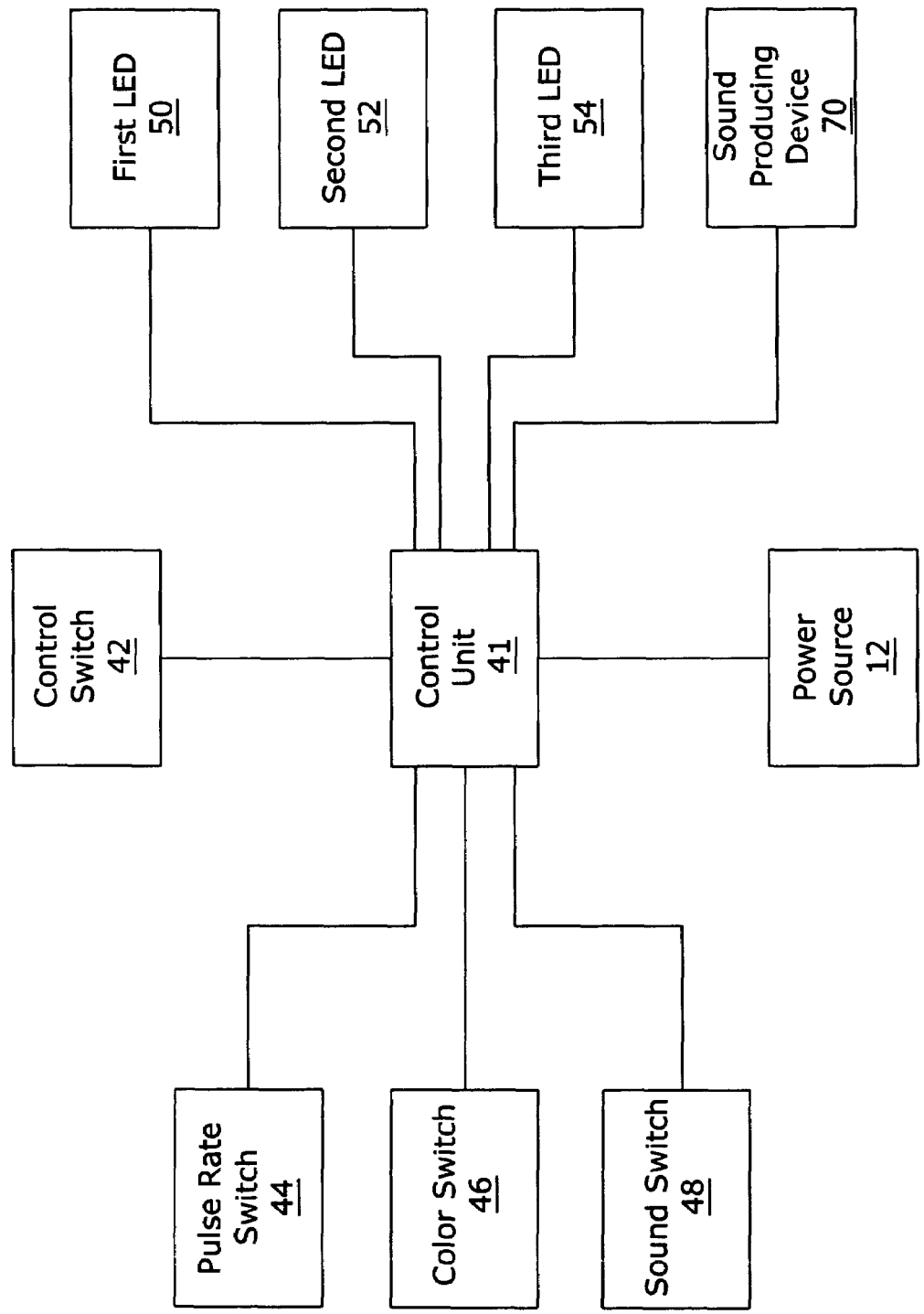
FIG. 9 is a block diagram illustrating the electrical components of the present invention.

The control unit 41 is electrically connected to the light source to control the light source as shown in FIG. 9 of the drawings. A power source 12 (e.g. battery) is electrically connected to the control unit 41 to provide electrical power to all of the electronic devices used in the present invention.

A control pad 40 is in communication with the control unit 41 to control the light source (and the sound producing device 70 discussed later). The control pad 40 preferably includes a control switch 42 to turn the light source on or off, a pulse rate switch 44 to control a pulse rate of light emitted by the light source, and a color switch 46 to control a light color emitted by the light source as illustrated in FIGS. 1, 2, 3, 5, 6 and 9 of the drawings. The light color emitted may be adjusted to various light colors, particularly when the three LEDs 50, 52, 54 are utilized.

E. Fiber Optic Fishing Line

The length of fiber optic fishing line 60 is connected to the spool 24 within the fishing reel 20 as shown in FIG. 3 of the drawings. The fiber optic fishing line 60 extends through a line guide 30 within the housing 21 and through the plurality of eyelets 16 on the fishing rod 14.

The fiber optic fishing line 60 is comprised of the inner end 62 positioned within the fishing reel 20 to receive light emitted by the light source as shown in FIG. 3 of the drawings. The distal end 64 of the fiber optic fishing line 60 is for emitting light transferred through the length of fiber optic fishing line 60. The distal end 64 may be frayed into a plurality of structures to provide a plurality of light sources.

The distal end 64 of the fiber optic fishing line 60 is further attached to the fishing hook 18, fishing lure and/or bait ("fishing device") to illuminate the same. The distal end 64 may be positioned inside of the fishing device to illuminate the fishing device from within or positioned external of the fishing device to illuminate the fishing device externally (and to provide an enticing light for fish).

Figure 7:
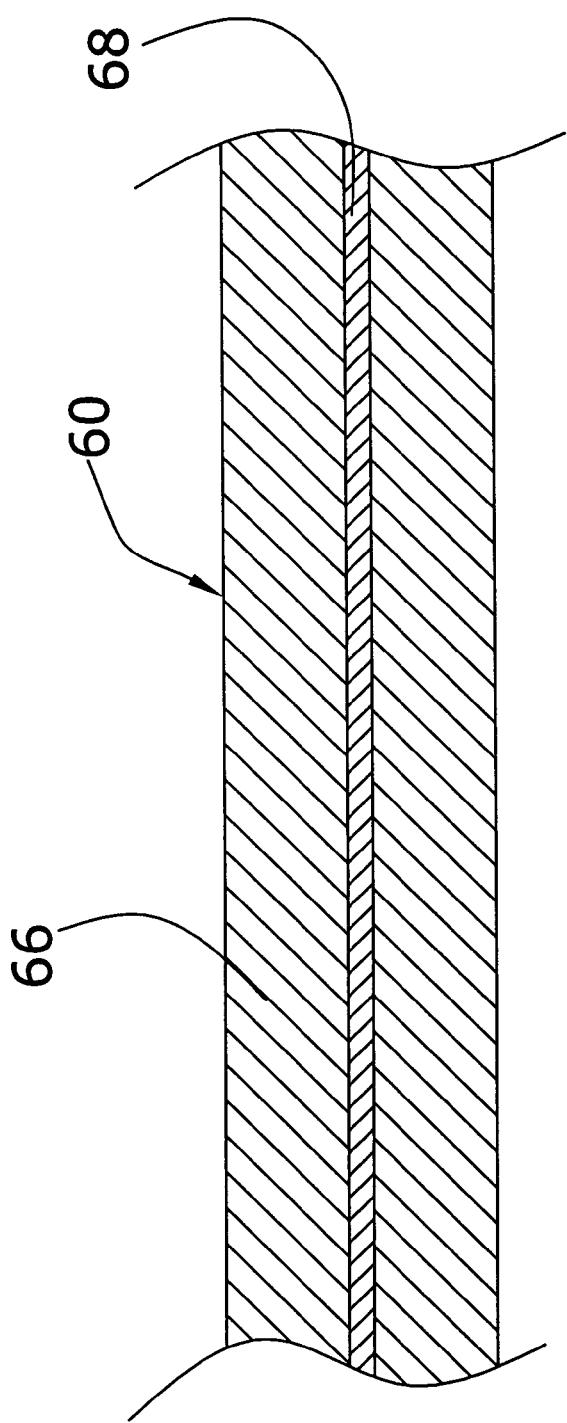
FIG. 7 is a side cutaway view of the fiber optic fishing line illustrating the fiber-optic core surrounded by the monofilament fishing line.
Figure 8:
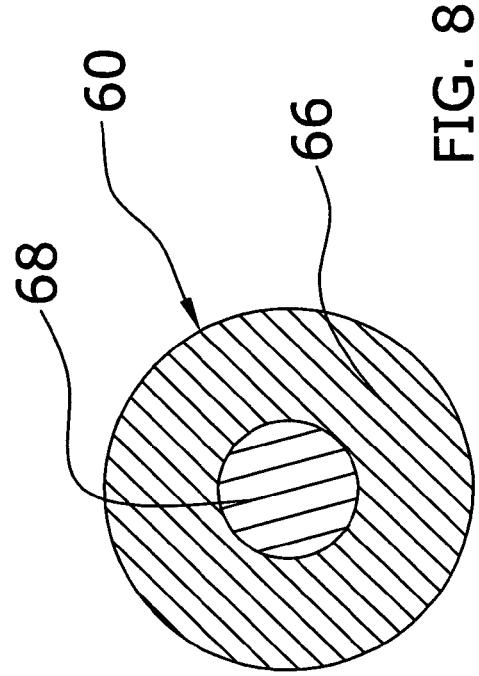
FIG. 8 is a cross sectional view of the fiber optic fishing line illustrating the fiber-optic core surrounded by the monofilament fishing line.

The length of fiber optic fishing line 60 is preferably comprised of a fiber-optic core 68 encased by a monofilament fishing line 66 as best illustrated in FIGS. 7 and 8 of the drawings. However, the fiber optic fishing line 60 may be comprised of other structures capable of transferring light and strong enough to catch a fish.

G. Sound Producing Device

In addition to the illumination properties of the present invention, a sound producing device 70 may be connected to the fiber optic fishing line 60 for generating sound waves within the fiber optic fishing line 60 to be transmitted to a distal end 64 of the fiber optic fishing line 60. The control pad 40 includes a sound switch 48 for controlling the sound level emitted by the sound producing device 70.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A fishing rod illumination system, comprising:
   a fishing reel;
   a light source positioned within said fishing reel, wherein said light source is capable of emitting various light colors at various pulse rates;
   a control pad in communication with said light source to control said light source; and
   a length of fiber optic fishing line connected to said fishing reel;
   wherein said length of fiber optic fishing line is comprised of an inner end positioned within said fishing reel to receive light emitted by said light source, and a distal end for emitting light transferred through said length of fiber optic fishing line;
   wherein said fishing reel includes a spool that receives and dispenses said length of fiber optic fishing line;
   wherein said fishing reel includes a tube that has an interior lumen to receive light emitted by said light source, and wherein said inner end extends through and into said tube.

2. The fishing rod illumination system of claim 1, wherein said length of fiber optic fishing line is comprised of a fiber-optic core encased by a monofilament fishing line.

3. The fishing rod illumination system of claim 1, wherein said inner end is directed substantially towards said light source.

4. The fishing rod illumination system of claim 3, wherein said fishing reel includes a housing with an interior cavity that receives said light source, and including a cone attached to an end of said tube for directing light emitted from said light source into said interior lumen of said tube.

5. The fishing rod illumination system of claim 1, wherein said control pad includes a control switch to turn said light source on or off.

6. The fishing rod illumination system of claim 1, wherein said control pad includes a pulse rate switch to control a pulse rate of light emitted by said light source.

7. The fishing rod illumination system of claim 1, wherein said control pad includes a color switch to control a light color emitted by said light source.

8. The fishing rod illumination system of claim 1, wherein said light source is comprised of a first LED emitting a first colored light, a second LED emitting a second colored light and a third LED emitting a third colored light.

9. The fishing rod illumination system of claim 8, wherein said first colored light consists of yellow, wherein said second colored light consists of red and wherein said third colored light consists of blue.

10. The fishing rod illumination system of claim 1, including a control unit electrically positioned between said control pad and said light source.

11. The fishing rod illumination system of claim 1, including a sound producing device connected to said fiber optic fishing line for generating sound waves within said fiber optic fishing line to be transmitted to a distal end of said fiber optic fishing line.

12. The fishing rod illumination system of claim 11, wherein said control pad include a sound switch for controlling a sound level emitted by said sound producing device.

13. A fishing rod illumination system, comprising:
    a fishing reel;
    a light source positioned within said fishing reel, wherein said light source is capable of emitting various light colors at various pulse rates, and wherein said light source is comprised of a first LED emitting a first colored light, a second LED emitting a second colored light and a third LED emitting a third colored light, wherein said first colored light consists of yellow, wherein said second colored light consists of red and wherein said third colored light consists of blue;
    a control unit electrically connected to said light source to control said light source;
    a power source electrically connected to said control unit;
    a control pad in communication with said control unit to control said light source, wherein said control pad includes a control switch to turn said light source on or off, a pulse rate switch to control a pulse rate of light emitted by said light source, and a color switch to control a light color emitted by said light source; and
    a length of fiber optic fishing line connected to said fishing reel, wherein said length of fiber optic fishing line is comprised of an inner end positioned within said fishing reel to receive light emitted by said light source, and a distal end for emitting light transferred through said length of fiber optic fishing line;
    wherein said fishing reel includes a spool that receives and dispenses said length of fiber optic fishing line;
    wherein said fishing reel includes a tube that has an interior lumen to receive light emitted by said light source, and wherein said inner end extends through and into said tube, wherein said inner end is directed substantially towards said light source;
    wherein said fishing reel includes a housing with an interior cavity that receives said light source, and including a cone attached to an end of said tube for directing light emitted from said light source into said interior lumen of said tube.

14. The fishing rod illumination system of claim 13, wherein said length of fiber optic fishing line is comprised of a fiber-optic core encased by a monofilament fishing line.

15. The fishing rod illumination system of claim 13, including a sound producing device connected to said fiber optic fishing line for generating sound waves within said fiber optic fishing line to be transmitted to a distal end of said fiber optic fishing line.

16. The fishing rod illumination system of claim 15, wherein said control pad include a sound switch for controlling a sound level emitted by said sound producing device.

17. A fishing rod illumination system, comprising:

a fishing reel;

a light source positioned within said fishing reel, wherein said light source is capable of emitting various light colors at various pulse rates, and wherein said light source is comprised of a first LED emitting a first colored light, a second LED emitting a second colored light and a third LED emitting a third colored light, wherein said first colored light consists of yellow, wherein said second colored light consists of red and wherein said third colored light consists of blue;

a control unit electrically connected to said light source to control said light source;

a power source electrically connected to said control unit;

a control pad in communication with said control unit to control said light source, wherein said control pad includes a control switch to turn said light source on or off, a pulse rate switch to control a pulse rate of light emitted by said light source, and a color switch to control a light color emitted by said light source;

a length of fiber optic fishing line connected to said fishing reel, wherein said length of fiber optic fishing line is comprised of an inner end positioned within said fishing reel to receive light emitted by said light source, and a distal end for emitting light transferred through said length of fiber optic fishing line;

wherein said length of fiber optic fishing line is comprised of a fiber-optic core encased by a monofilament fishing line;

wherein said fishing reel includes a spool that receives and dispenses said length of fiber optic fishing line;

wherein said fishing reel includes a tube that has an interior lumen to receive light emitted by said light source, and wherein said inner end extends through and into said tube, wherein said inner end is directed substantially towards said light source;

wherein said fishing reel includes a housing with an interior cavity that receives said light source, and including a cone attached to an end of said tube for directing light emitted from said light source into said interior lumen of said tube; and a sound producing device connected to said fiber optic fishing line for generating sound waves within said fiber optic fishing line to be transmitted to a distal end of said fiber optic fishing line;

wherein said control pad include a sound switch for controlling a sound level emitted by said sound producing device.

18. A fishing rod illumination system, comprising:

a fishing reel;

a light source positioned within said fishing reel;

a control pad in communication with said light source to control said light source; and a length of fiber optic fishing line connected to said fishing reel;

wherein said length of fiber optic fishing line is comprised of an inner end positioned within said fishing reel to receive light emitted by said light source, and a distal end for emitting light transferred through said length of fiber optic fishing line;

wherein said fishing reel includes a spool that receives and dispenses said length of fiber optic fishing line;

wherein said fishing reel includes a tube that has an interior lumen to receive light emitted by said light source, and wherein said inner end extends through and into said tube.

* * * * *